United States Patent
Saupe

Patent Number: 5,462,091
Date of Patent: Oct. 31, 1995

[54] ADHESION OF HALOPOLYMERS TO NYLON

[75] Inventor: Timothy P. Saupe, DeForest, Wis.

[73] Assignee: The Goodyear Tire & Rubber Company, Akron, Ohio

[21] Appl. No.: 118,344

[22] Filed: Sep. 9, 1993

[51] Int. Cl.$^6$ ............................................. F16L 11/04
[52] U.S. Cl. ........................ 138/126; 138/141; 428/522; 525/245
[58] Field of Search ........................... 138/125, 126, 138/124, 132, 141; 428/522

[56] References Cited

U.S. PATENT DOCUMENTS

| | | | |
|---|---|---|---|
| 4,087,343 | 5/1978 | Custer et al. | 204/219 |
| 4,229,333 | 10/1980 | Wolff et al. | 260/23.7 M |
| 4,633,912 | 1/1987 | Pilkington et al. | 138/132 |
| 4,802,938 | 2/1989 | Kitami et al. | 138/126 |
| 5,016,675 | 5/1991 | Igarashi et al. | 138/125 |
| 5,084,314 | 1/1992 | Igarashi et al. | 138/125 |
| 5,200,469 | 4/1993 | Hous | 525/245 |
| 5,246,778 | 9/1993 | Costemalle et al. | 138/141 |

*Primary Examiner*—David Scherbel
*Assistant Examiner*—James F. Hook
*Attorney, Agent, or Firm*—Marc R. Dion, Sr.; J. D. Wolfe

[57] ABSTRACT

A new curable compounded halopolymer that exhibits in the cured state good to excellent adhesion to polyamides. These curable halopolymer achieves better adhesion due to a balance of carbon black relative to talc, preferable with the cyclohexyl benzothiazole sulfenamide or related benzothiazole sulfenamide and are highly desirable in making specialty hoses and belts.

10 Claims, 1 Drawing Sheet

ADHESION OF HALOPOLYMERS TO NYLON

FIELD OF THE INVENTION

This invention relates to a method of curing a halopolymer to give an improved adhesive bond to a polyamide and to the resulting laminate. More particularly, this invention relates to the production of a shaped laminated body having a halopolymer adhered to a polyamide layer to give the shaped laminate improved properties in adhesion and resistance to chemicals. Specifically, this invention relates to the manufacture of improved articles such as belts and hoses and to said articles per se having an adhesive bond exhibiting an adhesion of at least 6 pounds per square inch between the cured halopolymer and the polyamide and preferably 7 or more.

BACKGROUND

Hoses for refrigeration and air conditioning systems, such an automobile air conditioners present problems in requiring flexible tubing or hoses of high strength capable of withstanding relatively high temperatures. With the fluorocarbon refrigerants, difficulty is experience with the hose material loosing the fluorocarbons and cracking. Consequently, laminates of different rubbers have come into wide use but problems are still experienced with the laminate delaminating due to poor adhesion between the laminate members and cracking of the rubbers due to presence of certain metal salts such as those formed between halogen of the halopolymer and the alkali and alkaline earth oxides of the curing recipes. Also, heretofore, it has been necessary to use a tie gum to get good adhesion between a halopolymer layer and a core of polyamide.

DISCLOSURE OF THE INVENTION

A laminated article such as a belt or hose is provided comprising a core layer of a polyamide having adhered preferably directly to it a layer of a halopolymer to give an adhesive bond of 5 and preferably of 6 or more pounds per square inch. This adhesive bond is achieved by compounding the halopolymer with a bis-dienophile crosslinker, alkali or alkaline earth oxide to neutralize the halogen acids formed, a peroxide or sulfur curative in amounts customarily used together with about 25 to about 70 and preferably about 35 to about 55 parts of carbon black and about 8 to about 70 and preferably about 30 to about 55 parts of talc. It is amazing to discover that by adjusting the amount of carbon black and talc used in compounding the halopolymer, the resulting cured halopolymer has adhesion sufficient to eliminate the need for a tie gum in forming the halopolymer polyamide laminate.

BRIEF DESCRIPTION OF THE DRAWINGS

The drawings consist of FIGS. 1 and 2, where.

Figure 1:
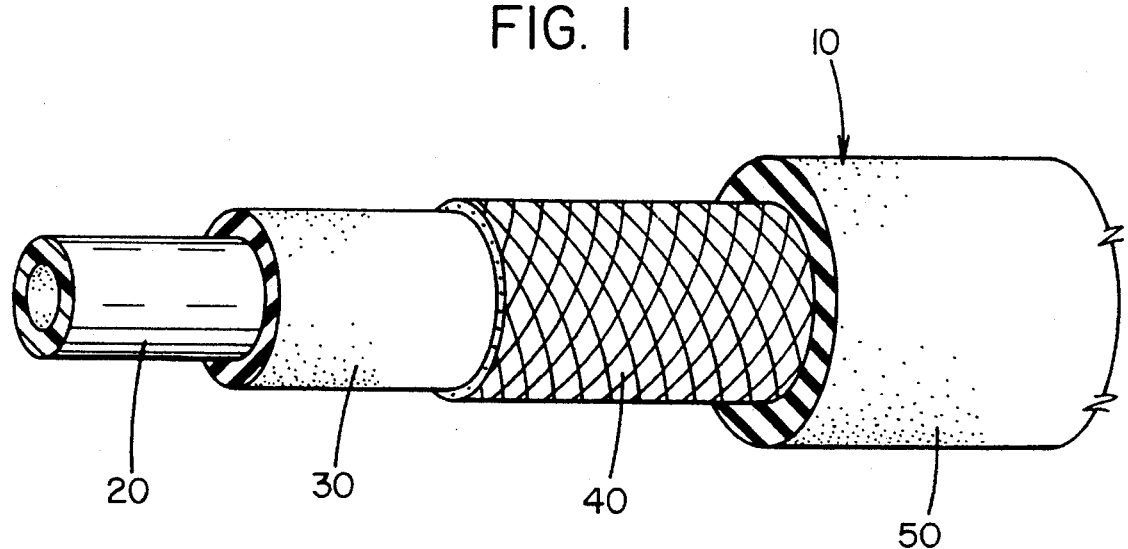
FIG. 1 is a perspective view With a portion cut away to illustrate the invention and FIG. 2 is a sectional view of an alternate embodiment showing a length of a belt with a portion cut away to show the materials, by numerals, that make up the composite belt.
Figure 2:
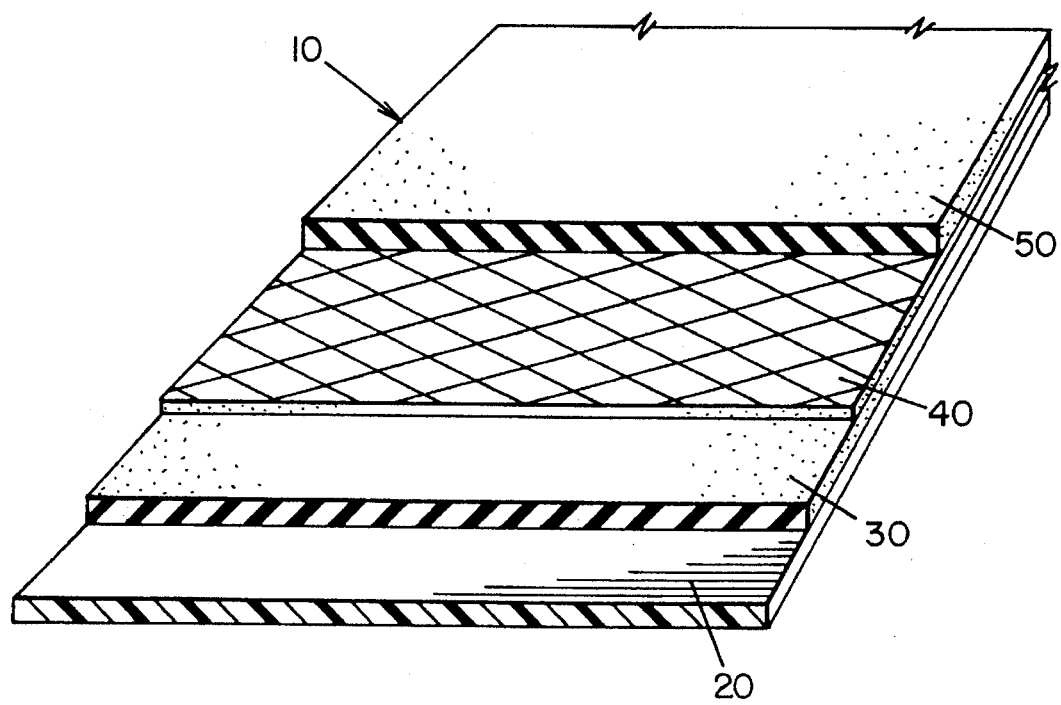

With reference to the drawing a composite hose 10 is shown. The hose 10 has a core 20 of a polyamide such as those commercially designated as nylon-6, nylon-66, nylon-8, nylon-10, nylon-11, nylon-12, nylon-666, nylon-610 and related or like polyamides or polyamide-polyether copolymers. Normally, the polyamide is extruded as a hollow tube.

Numeral 30 designates a compounded halopolymer applied over the polyamide core. Preferably the compounded halopolymer is extruded over the core 10 to adhere the two layers together. It should be noted that this invention does not require the inclusion of an adhesive or tie gum as is the usual practice when forming laminates with polyamides. Thus, the manner in which the halopolymer is compounded and cured gives the cured compounded halopolymer sufficient adhesive ability to yield a satisfactory laminate with polyamides.

If desired, a reinforcing member 40, such as fabric filaments is applied or wrapped over the compounded halopolymer layer in the customary hose reinforcing technique. After the reinforcing layer is wrapped over the compounded halopolymer an additional layer 50 of compounded halopolymer may be extruded over the hose. Alternatively, other rubber covers, such as EPDM, may be applied depending on the service and economics of manufacture.

The Pilkington, et al U.S. Pat. No. 4,633,912 describes the customary method of making these hoses but requires the use of an adhesive or tie gum to get satisfactory adhesion and resistance to delamination between the polyamide and the halopolymer. The disclosure of U.S. Pat. No. 4,633,912 is hereby incorporated by reference to supply the description of the various compounded ingredients and their amounts.

A chlorobutyl rubber stock was compounded in the amounts shown in Table 1 with the ingredients shown. The accelerator shown in Table 1 is N-cyclohexyl-2-benzothiazole sulfenamide.

A sheet of the compounded chlorobutyl rubber was applied to a sheet of nylon and cured for 40 minutes at 155° C. Then the adhesion was run on the cured laminate and the adhesion is as shown. It was observed and discovered that at about 30 to about 35 parts of talc to about 40 to about 45 parts of carbon black the adhesion was optimum.

TABLE 1

|  | D | E | F | G | H |
| --- | --- | --- | --- | --- | --- |
| Chlorobutyl Rubber | 100 | 100 | 100 | 100 | 100 |
| Antioxidant | 1 | 1 | 1 | 1 | 1 |
| Stearic Acid | 1 | 1 | 1 | 1 | 1 |
| Carbon Black | 70 | 60 | 50 | 40 | 30 |
| Talc |  | 10 | 20 | 30 | 40 |
| MgO Dispersion | .5 | .5 | .5 | .5 | .5 |
| ZnO Dispersion | 3 | 3 | 3 | 3 | 3 |
| Bis-Maleimide | 3 | 3 | 3 | 3 | 3 |
| Accelerator | .5 | .5 | .5 | .5 | .5 |
| Original Physicals |  |  |  |  |  |
| Tensile, psi | 1665 | 1809 | 1745 | 1534 | 1300 |
| Elongation, % | 177 | 191 | 227 | 242 | 271 |
| 100% Modulus, psi | 1061 | 1053 | 845 | 754 | 629 |
| Hardness |  | 73 | 71 | 67 | 64 |
| Adhesion to Nylon lbs/inch | 4.8 | 5.8 | 9.0 | 12.2 | 8.2 |

This direct bonding compound is free of classical in-situ bonding agents and is capable of forming stock tear adhesive bonds during vulcanization of the rubber in intimate contact with the nylon. This result is not obvious to those skilled in the art and not apparent from previous teachings.

Similar results is obtainable with bromobutyl rubber. The curable compounded halopolymers of this invention can be used beneficially in making belts where a polyamide layer is used or needed. For example, a belt can be plied up with rubber coated fabric and a ply of fabric coated with the curable compounded halopolymer can be used to adhere the polyamide or nylon ply to the rest of the belt, for instance, to give the belt a face ply for handling specific materials.

While certain representative embodiments and details have been shown for the purpose of illustrating the invention, it will be apparent to those skilled in this art that various changes and modifications may be made therein without departing from the spirit or scope of the invention.

What is claimed is:

1. A curable composition of a halopolymer capable of exhibiting in a cured state an improved adhesion to a polyamide comprising 100 parts of a halopolymer compounded with a bis-dienophile as a crosslinker, alkali/or alkaline earth oxide, a curative selected from the class consisting of a peroxide and a sulfur curative, about 25 to about 70 parts of carbon black and about 8 to about 70 parts of talc.

2. The composition of claim 1 wherein the curative is N-cyclohexyl-2-benzothiazole sulfenamide.

3. The composition of claim 1 wherein the halopolymer is chlorobutyl rubber.

4. The composition of claim 1 wherein the carbon black is about 35 to about 55 parts carbon black and about 30 to about 55 parts of talc.

5. The curable composition of claim 1 fabricated as part of a belt.

6. The curable composition of claim 1 wherein the polyamide consists of 100 parts of a halopolymer compounded with a bis-dienophile as a crosslinker, an agent from the class consisting of alkali oxide and alkaline earth oxide, a curative selected from the class consisting of a peroxide and a sulfur curative, about 25 to about 70 parts of carbon black and about 8 to about 70 parts of talc.

7. A hose comprising an inner core of polyamide covered with a layer of a cured halopolymer, containing a bis-dienophile, a halogen neutralizer selected from the class of alkali and alkaline earth oxides and their mixtures, a curative selected from class consisting of a peroxide and sulfur curative and a filler loading on a 100 parts of halopolymer basis, of about 25 to about 70 parts of carbon black and about 8 to about 70 parts of talc.

8. The hose of claim 7 wherein the halopolymer layer is covered with a layer of the halopolymer and a covering of another rubber layer.

9. The hose of claim 7 wherein the cured halopolymer is bromobutyl rubber.

10. The hose of claim 7 wherein the carbon black is about 35 to about 55 parts and the talc is about 30 to about 55 parts.

* * * * *